US006889869B2

(12) United States Patent
Hallin

(10) Patent No.: US 6,889,869 B2
(45) Date of Patent: May 10, 2005

(54) TABLET DISPENSER

(75) Inventor: Cristian Hallin, Påaarp (SE)

(73) Assignee: Telum AB, Halmstad (SE)

( * ) Notice: Subject to any disclaimer, the term of this patent is extended or adjusted under 35 U.S.C. 154(b) by 47 days.

(21) Appl. No.: 10/420,009

(22) Filed: Apr. 21, 2003

(65) Prior Publication Data

US 2004/0074915 A1 Apr. 22, 2004

Related U.S. Application Data

(63) Continuation of application No. 09/959,490, filed as application No. PCT/SE99/00691 on Apr. 28, 1999, now abandoned.

(51) Int. Cl.[7] .......................... B65H 1/08; G07F 11/16; B65G 59/00

(52) U.S. Cl. ....................... 221/223; 221/226; 221/232; 221/260; 221/270

(58) Field of Search ................................ 221/198, 223, 221/226, 232, 260, 261, 264, 270, 272

(56) References Cited

U.S. PATENT DOCUMENTS 3,370,746 A 2/1968 Haas .......................... 221/24
3,565,284 A 2/1971 Hinterreiter ................. 221/229
3,854,626 A * 12/1974 Krechmar ................... 221/264
4,541,547 A * 9/1985 Miknyocki et al. ......... 221/260
4,792,057 A * 12/1988 Mizer et al. ................ 221/187
5,178,298 A 1/1993 Allina ......................... 221/24
5,230,440 A * 7/1993 Kurokawa .................. 221/232
5,366,112 A 11/1994 Hinterreiter ................. 221/198
5,405,047 A 4/1995 Hansen ....................... 221/190
5,460,295 A * 10/1995 Law ........................... 221/270

* cited by examiner

*Primary Examiner*—Gene O. Crawford
(74) *Attorney, Agent, or Firm*—Smith, Gambrell & Russell

(57) ABSTRACT

The disclosure relates to a tablet dispenser comprising an elongate container (10) for tablets (12) and a dispensing device for discharging tablets out of the container (10). The dispensing device includes an operating unit (11) for manual action, a joint mechanism (14) connected to the operating unit (11), and a slide (15) projecting from the joint mechanism (14) for accommodating and dispensing a tablet (12). The operating unit (13), the joint mechanism (14) and the slide (15) are of one piece manufacture.

24 Claims, 2 Drawing Sheets

TABLET DISPENSER

The present application is a continuation of U.S. application Ser. No. 09/959,490, filed Dec. 7, 2001, now abandoned, which is a 371 national stage filing of PCT/SE99/00691, filed Apr. 28, 1999, both of which are incorporated herein by reference in their entirety.

TECHNICAL FIELD

The present invention relates to a tablet dispenser comprising an elongate container for tablets and a dispensing device for dispensing tablets out of the container. The term tablets is here taken to signify both tablets containing medicines and other types of tablets.

BACKGROUND ART

A dispenser for tablets is put into use in, for example, the dosing of medicines. In such instance, the commonest version of dispenser is in the form of a box with one or more projecting slides. Such a slide normally consists of a plurality of compartments. A dispenser in the form of a box in accordance with the foregoing consists of several components which are manufactured separately and must then be assembled to form a finished unit. As a result, manufacturing costs will be high.

There is a need in the art for a dispenser which may be manufactured at low cost, which is small in size and easy to carry and which makes possible the advancement of one tablet at a time. Such a dispenser would also be usable in other contexts, for example for sweets (candies) in tablet form.

OUTLINE OF THE INVENTION

One object of the present invention is to realise a dispenser which satisfies the above-outlined needs. This object is attained in that the present invention has been given the characterizing features as set forth in appended Claim 1.

Further advantages and characterizing features of the present invention are apparent from the appended specification, Drawings and subclaims.

BRIEF DESCRIPTION OF THE ACCOMPANYING DRAWINGS

The present invention will now be described in greater detail hereinbelow, with the aid of preferred embodiments and with reference to the accompanying Drawings, in which.

DESCRIPTION OF PREFERRED EMBODIMENTS

Figure 1:
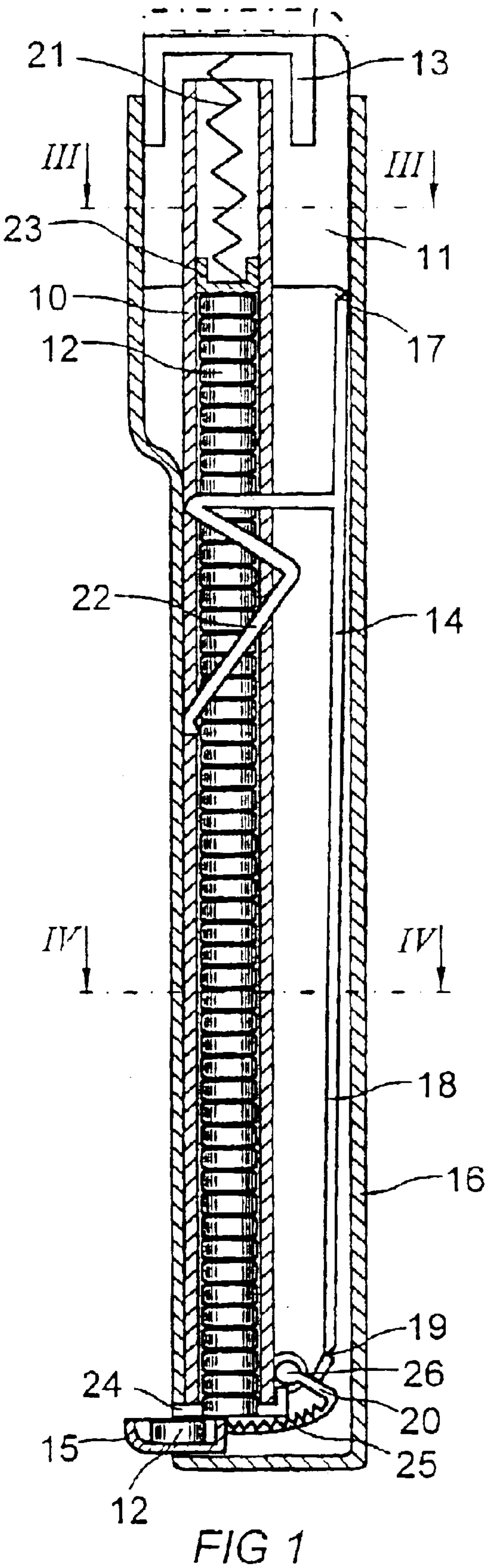
FIG. 1 is a side elevation, partly in section, from the line I—I in FIG. 4, of an embodiment of a dispenser according to the present invention.

In the embodiment illustrated in FIG. 1 of a dispenser according to the present invention, all included components are disposed in an elongate housing 16. The housing 16 is of substantially rectangular cross section (see FIG. 4) and wholly encloses a container 10 in the form of a tube of circular cross section or a cross section formed to accommodate the tablets 12 which are to be located in the container. In the container 10, there are shown in FIG. 1 a plurality of objects in the form of tablets 12. The container 10 and the dispenser may also be employed for other types of objects which are stackable in this manner. In FIG. 1, the dispenser is shown in the normal position of use with the container 10 extended in the substantially vertical position.

In FIG. 1, a dispensing device projects up out of the housing 16 with an upper member in the form of an operating unit 11. The operating unit 11 is designed as a button which, on depression, dispenses a tablet 12 out of an aperture at the bottom of the housing 16 (see FIG. 2). The operating unit 11 includes a lid or a closure member 13 which, in the removed state, exposes an aperture for replenishment of tablets 12 or the like. The operating unit, or the button 11, is pivotally connected to a joint mechanism 14 for transferring the movement on depression of the button to a reciprocating slide 15. The joint mechanism 14 includes a first arm 18 connected to the operating unit 11 and a second arm 20 connected to the slide 15. The first arm 18 is connected to the operating unit 11 by the intermediary of a first pivot 17 and to the second arm 20 by the intermediary of a second pivot 19.

In the illustrated embodiment, the first arm 18 is an elongate rod of rectangular, T-shaped or other suitably formed cross section and extends through the housing 16 together with the container 10. In its position of rest, the slide 15 is placed directly beneath the lower aperture of the container 10 so that the lowermost of the tablets 12 accommodated in the container 10 may fall down into the slide 15. Suitably, the slide 15 is therefore designed as a scoop or the like with cup-shaped inner walls. Alternatively, the slide may have a through-going aperture so that the lowermost tablet 12 rests on the inside of the bottom of the housing 16. The height of the slide in this version corresponds to the thickness of one tablet.

The button 11 is designed with outer dimensions which correspond to the inner dimensions of the housing 16 for guiding the movement of the button 11. In that portion of the housing where the button 11 moves, the housing 16 is flared somewhat so as to permit free movement of the button 11 outside the container 10, see also FIG. 3. Beneath the button 11, and particularly beneath the lid 13, there is disposed a first spring 21. The spring 21 extends partly inside the container 10 and rests against a lid 23 located in the container 10 and in its turn resting on the uppermost tablet 12. The spring. 21 serves for advancement of the tablets and return on depression of the button 11. The container 10 rests at the bottom against an abutment 24 beneath which the slide 15 is movable in a reciprocating movement transversely of the longitudinal direction of the container.

The first spring 21 exercises a certain bias on the button 11. Further spring bias is exercised by a second spring 22 which departs from the first arm 18 and, in one preferred embodiment, constitutes and integrated part thereof. As will be apparent from FIG. 1, the second spring 22 is of S-configuration and abuts with its free end against the inside of the housing 16, possibly against a heel mounted thereon.

The second arm 20 merges in a first end in a portion 25 which is flexible and foldingly connected to the slide 15 and which constitutes a flexible power transmission means which converts a pivotal movement (see below) of the arm 20 into a linear movement in the slide 15. In a second end, the second arm 20 has a transverse stub shaft 26 about whose centre axis the arm is pivotal. On pivoting of the second arm 20 about the stub shaft 26, the pivot 19 is bent and the folded portion 25 is straightened out and imparts to the slide 15 a linear movement. In its opposing ends, the stub shaft 26 is journalled in bushings secured on or of one piece manufacture with the insides of the housing 16 (see FIGS. 1 and 3).

Figure 2:
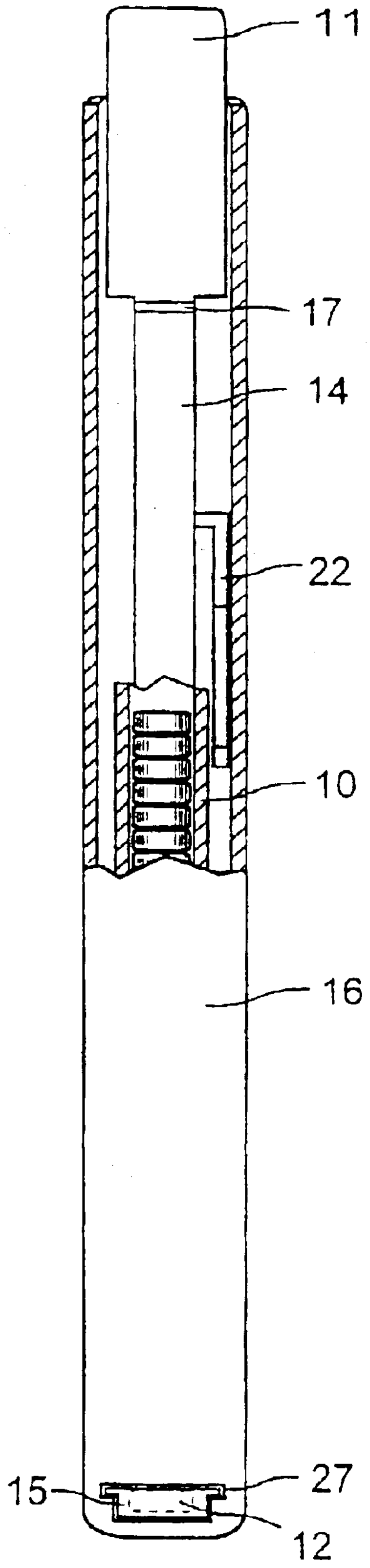
FIG. 2 is a side elevation, partly in section, of the dispenser of FIG. 1, seen from another angle.

In FIG. 1, the button 11 has been depressed from a position shown by ghosted lines, whereby the slide 15 has been partly shifted out of the housing 16. On further depression of the button 11, the slide 15 will be displaced further, so that the tablet 12 will be accessible. In the alternative with a through-going aperture in the slide, the tablet 12 falls down through the slide as soon as the tablet is free from the bottom of the housing 16. FIG. 2 shows the elongate housing 16 with a hole 27 made at the bottom, through which the slide 15 may be displaced. It will further be apparent that the second spring 22 projects out at a right angle from the first arm 18 and extends beside the container 10.

Figure 3:
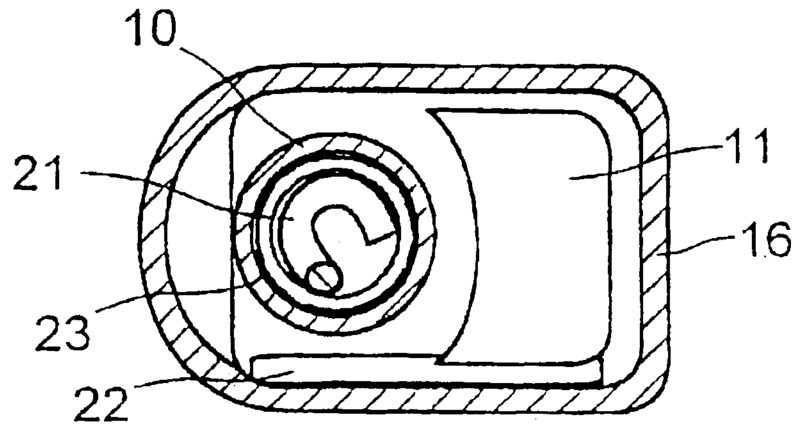
FIG. 3 is a cross sectional view from the line III—III in FIG. 1.

The cross sectional view in FIG. 3 shows that lid 23 and the first spring 21 abutting thereon. The second spring 22 extends beneath the button 11 at the side of the container 10.

Figure 4:
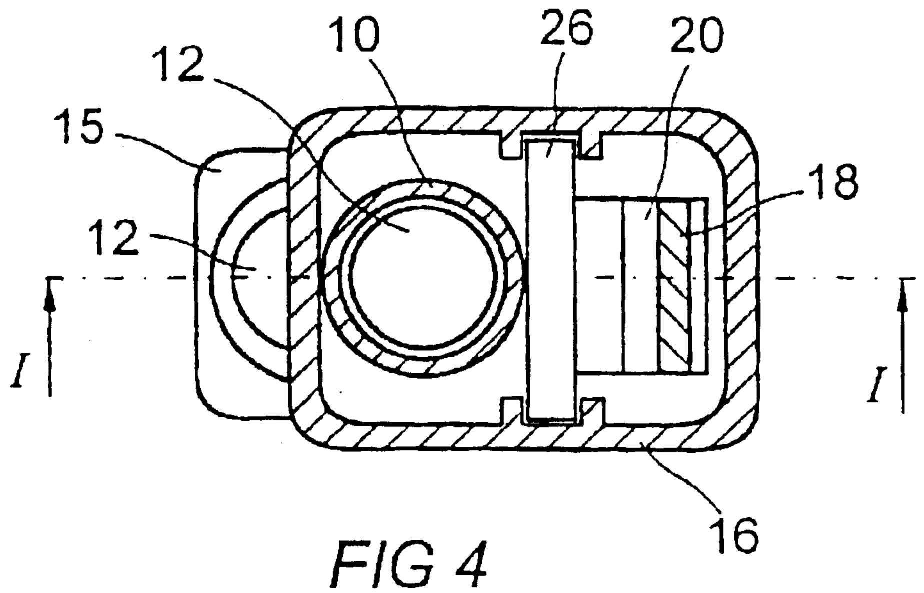
FIG. 4 is a cross sectional view from the line IV—IV in FIG. 1.

FIG. 4 shows the container 10 with tablets 12 placed therein and the partly projecting slide 15. The slide 15 also holds a tablet 12. It will further be clearly apparent how the opposing ends of the stub shaft 26 are accommodated in bushings, whereby the arm 20 and the stub shaft are pivotally journalled in the housing 16.

The container 10 may be designed in different manners and with a different cross sectional configuration to that shown. However, it is appropriate that its configuration be adapted to the configuration of the tablets which are to be placed therein.

Preferably, both the housing 16 and the container 10 are manufactured from plastic material. This also applies to the operating unit 11, the joint mechanism 14, the slide 15 and the second spring 22. In addition, these units are suitably injection moulded in one piece.

The present invention should not be considered as restricted to that described above and shown on the Drawings, many modifications being conceivable without departing from the scope of the appended Claims.

What is claimed is:

1. A tablet dispenser comprising an elongate container for tablets, a dispensing device with a slide disposed at one end of the dispenser for discharging a tablet, and an operating unit at the other, opposing end of the dispenser, said operating unit being movable in the longitudinal direction of the dispenser, and a joint mechanism for transferring movements from the operating unit to the slide, wherein the joint mechanism has a first arm movable in a longitudinal direction of the dispenser and connected to the operating unit, the first arm being connected to a linkage system for converting the longitudinal movement of the operating unit into a transverse movement in the slide wherein the linkage system comprises a second arm connected to the slide and wherein the first arm and the second arm are pivotally connected to one another by the intermediary of a pivot.

2. The tablet dispenser as claimed in claim 1, wherein the dispensing device is disposed with one operating unit partly projecting out of an elongate housing and the elongate container for the tablets is disposed enclosed in the housing.

3. The tablet dispenser as claimed in claim 1, wherein the dispensing device is spring-biased to a first position in which the slide is disposed in a position within the housing for accommodating a tablet and displaceable against spring action to a second position in which the slide projects out of the housing.

4. The tablet dispenser as claimed in claim 1, wherein the container for the tablets is designed as a tube discharging above the slide.

5. The tablet dispenser as claimed in claim 1, wherein the operating unit, the joint mechanism and the slide are of one piece manufacture from injection moulded plastic.

6. The tablet dispenser as claimed in claim 1 wherein the operating unit, the joint mechanism and the slide are of one piece manufacture by injection moulding.

7. The tablet dispenser as claimed in claim 1, wherein said pivot is a second pivot and wherein the first arm is pivotally connected to the operating unit by the intermediary of a first pivot.

8. The tablet dispenser as claimed in claim 7, wherein the joint mechanism is spring-biased by a spring departing from the joint mechanism and tensioned against the housing.

9. The tablet dispenser as claimed in claim 1, wherein the dispensing device is spring-biased by a first spring tensioned against the operating unit.

10. The tablet dispenser as claimed in claim 9, wherein the joint mechanism is spring-biased by a second spring departing from the joint mechanism and tensioned against the housing.

11. The tablet dispenser as claimed in claim 10, wherein the joint mechanism and the second spring are of one piece manufacture.

12. The tablet dispenser as claimed in claim 11, wherein the operating unit, the joint mechanism, the slide and the second spring are of one piece manufacture from injection moulded plastic.

13. A tablet dispenser comprising an elongate container (10) for tablets (12), a dispensing device with a slide (15) disposed at one end of the dispenser for discharging a tablet (12), and an operating unit (11) at the other, opposing end of the dispenser, said operating unit (11) being movable in the longitudinal direction of the dispenser, and a joint mechanism (14) for transferring movements from the operating unit (11) to the slide (15), characterized in that the joint mechanism (14) has a first arm (18) connected to the operating unit (11), the arm being connected to a linkage system (20, 25, 26) for converting the longitudinal movement of the operating unit (11) into a transverse movement in the slide (15), wherein the joint mechanism (14) includes a second arm (20) connected to the slide (15), and wherein the first arm (18) and the second arm (20) are pivotally connected to one another by the intermediary of a second pivot (19) and the first arm is pivotally connected to the operating unit (11) by the intermediary of a first pivot (17).

14. The tablet dispenser as claimed in claim 13, wherein the dispensing device is spring-biased to a first position in which the slide (15) is disposed in a position within the housing (16) for accommodating a tablet (12) and displaceable against spring action to a second position in which the slide (15) projects out of the housing (16).

15. The tablet dispenser as claimed in claim 13, wherein the dispensing device is spring-biased by a first spring (12) tensioned against the operating unit (11).

16. The tablet dispenser as claimed in claim 13 wherein the operating unit (11), the joint mechanism (14) and the slide (15) are of one piece manufacture by injection moulding.

17. A tablet dispenser, comprising:

a container for storing a stack of tablets;

a dispensing device with a slide disposed for receiving a tablet from the stack for dispensing of the tablet received;

an operating unit being adjustable in a longitudinal direction of the dispenser;

a joint mechanism which comprises a first arm connected to said operating unit and a linkage system connecting to said first arm, said linkage system further being connected to the slide and being arranged for converting longitudinal movement of said operating unit into a transverse movement in said slide, wherein said joint mechanism includes a second arm connected to said slide, and wherein said first arm and said second arm are pivotally connected to one another by a pivot.

18. The tablet dispenser of claim 17 wherein said pivot, pivotally connecting said first and second arms, represents a second pivot, and wherein said first arm is pivotally connected to said operating unit by a first pivot.

19. The dispenser of claim 17 wherein said slide is positioned within said container and extends out from said container when longitudinal movement in said operating unit is converted into transverse movement in said slide.

20. The tablet dispenser of claim 17 wherein said first arm, second arm and the connecting pivot connecting said first and second arms are injected molded as an integral unit with said connecting pivot being a thinner molded flex region provided between said arms.

21. The tablet dispenser of claim 17 wherein said second arm includes a foldable portion.

22. The tablet dispenser of claim 17 wherein said second arm comprises a pivot post and said dispenser further comprises bushings positioned within said container and receiving respective ends of said pivot post.

23. The dispenser of claim 17 wherein said slide includes a recessed region defined by cup-shaped inner walls for receiving a dispensed tablet.

24. The dispenser of claim 23 wherein said slide is positioned within said container and extends out from said container when longitudinal movement in said operating unit is converted into transverse movement in said slide.

* * * * *